United States Patent [19]

Iwasaki

[11] Patent Number: 5,701,526
[45] Date of Patent: Dec. 23, 1997

[54] PHOTOMETRY APPARATUS

[75] Inventor: Hiroyuki Iwasaki, Yokohama, Japan

[73] Assignee: Nikon Corporation, Tokyo, Japan

[21] Appl. No.: 762,062

[22] Filed: Dec. 9, 1996

[30] Foreign Application Priority Data

Dec. 13, 1995 [JP] Japan ............................ 7-324133

[51] Int. Cl.⁶ ............................................ G03B 7/08
[52] U.S. Cl. ................................... 396/234; 348/297
[58] Field of Search ................... 396/96, 234, 233; 348/229, 230, 297, 298, 296

[56] References Cited

U.S. PATENT DOCUMENTS

| | | | |
|---|---|---|---|
| 4,460,836 | 7/1984 | Tsunekawa et al. | 348/297 |
| 4,623,927 | 11/1986 | Hoshino | 348/298 |
| 4,719,846 | 1/1988 | Hoshino et al. | 396/96 |
| 4,774,588 | 9/1988 | Noda et al. | 348/297 |
| 4,912,496 | 3/1990 | Tamada et al. | 396/96 |
| 4,931,822 | 6/1990 | Yamano | 396/96 |
| 5,272,539 | 12/1993 | Kondo | 348/229 |
| 5,293,238 | 3/1994 | Nakano et al. | 348/229 |
| 5,515,132 | 5/1996 | Iwasaki | 348/234 |

Primary Examiner—W. B. Perkey
Attorney, Agent, or Firm—Oliff & Berridge

[57] ABSTRACT

Photometry apparatus and method accurately measure the degree of illumination of an object to be photographed during a long accumulated time. Influence of flicker is diminished when the accumulated time is short. The apparatus includes a photometry circuit which accomplishes photometry of the object field utilizing a photometry element of the accumulation type, an accumulated time establishment component establishes the updated accumulated time value of the photometry element on the basis of input accumulated time value and the output value of the photometry circuit, a weighted average component obtains the weighted average of the output of the accumulated time establishment component and the accumulated time value of the previous occasion, a weighted average determination component determines the weight of the weighed average component, and an accumulation control component controls the accumulation operation of the photometry element on the basis of the output of the weighted average component.

20 Claims, 12 Drawing Sheets

PHOTOMETRY APPARATUS

BACKGROUND OF THE INVENTION

1. Field of the Invention

The invention relates to a photometry apparatus that measures the degree of illumination of an object to be photographed, and more particularly to a photometry apparatus utilized in an automatic exposure control of a camera.

2. Description of Related Art

Conventionally, in photometry apparatus, photometry elements of the accumulation type are used. A subsequent accumulated time is obtained from the photometry value of the previous accumulated time by assuming that the brightness of the object to be photographed at the time of the subsequent occasion is substantially the same as that of the previous occasion. Calculation is accomplished based on this assumption. For example, there may be an occasion where an object to be photographed is illuminated in the direct flow of light from the sun. When the object to be photographed is still, then the brightness of the object remains substantially the same between previous and subsequent occasions. Even if the object is moving, the photometry cycle is generally faster than the movement of the photographic object and changes in brightness can adequately be followed. Thus, with a conventional photometry apparatus, there are no particular problems where the illumination source is the sun.

However, when illumination is created using an AC electric power source, there is a repetitive strengthening and weakening of the amount of light caused by cycles corresponding to cycles of the electric power source (for example, in the case of a 50 Hz electric power source, this would be 100 Hz). This produces a "flicker" phenomenon or flicker cycle. The flicker cycle is extremely fast in comparison with the movement of the object to be photographed. Since the flicker cycle is also fast in comparison with the photometry cycle of an ordinary photometry apparatus, the photometry time of the subsequent occasion does not have an illumination state equal to the photometry time of the previous occasion. In such a case, it is impossible to use the method indicated above to obtain the subsequent accumulated time from the photometry value of the previous occasion and accumulated time.

In order to overcome this problem, as shown in FIG. 13(A) and FIG. 13(B), the photometry of the second occasion is accomplished at one-half of the cycle of the flicker cycle of the illumination light source. On the basis of the average value of these photometry values, by calculating the photometry value and the accumulated time of the subsequent occasion, the average of the photometry parameters approach the effective value of the illumination intensity, thereby providing a prediction for the realization of stabilized photometry (as disclosed in Japanese patent publication No. 6-95200).

Therefore, the calculation of the influence of flicker cycle such as that described above is critical when the accumulated time is relatively short in comparison with the flicker. More specifically when the accumulated time is less than the time of about one cycle of flicker (in the case of 50 Hz one cycle of flicker is 10 mS) the calculation of flicker is critical. When the accumulated time is longer, then the strengthening and weakening of flicker during accumulation is repeated. Since the variation is canceled out, there is no particular need to consider the influence of the flicker.

However, with the conventional type of photometry apparatus discussed above, a subsequent accumulated time is ordinarily obtained from the second occasion photometry value, when the accumulated time is longer than the flicker cycle. As a result, there is a deterioration in the monitoring of changes in the illumination of the object to be photographed. This deterioration constitutes a problem.

SUMMARY OF THE INVENTION

The problem overcome by the invention is that when the accumulated time is short, the influence of the flicker cycle is controlled. When the accumulated time is long, a photometry apparatus can be provided that is capable of accomplishing good photometry in terms of monitoring changes in the degree of illumination of the object to be photographed.

In order to resolve the above problem, the invention includes a photometry component that accomplishes photometry of the object to be photographed utilizing photometry elements of the accumulation type. The invention includes an accumulated time establishment component that establishes a new accumulated time value of the photometry element on the basis of an output value of the photometry component and a previously accumulated time value. The invention further includes a weighted average determination component that outputs a weight to be given a new accumulated time, which is received from the accumulated time establishment component, to be used in weight averaging. A weighted average component is included that calculates using the weight received from the weighted average determination component a weighted average of previously accumulated time and the output of the accumulated time establishment component. An accumulation control component is included that controls the accumulation operation of the photometry elements on the basis of the output of the weighted average component.

The invention further provides a photometry apparatus where the weighted average determination component determines the weight in accordance with the accumulated time of an occasion. Also, the weighted average determination component determines the weight in accordance with the accumulated time of the previous occasion. The weighted average determination component provides that when the accumulated time value of the previous occasion is short, the proportion of the accumulated time value of the previous occasion is large. When the accumulated time value of the previous occasion is long, then the weighted average determination component makes the proportion of the output of the accumulated time establishment component large.

The invention includes a photometry apparatus where the weighted average determination component provides that the accumulated time value of the previous occasion changes the weight in a period of time that comprises approximately one cycle unit of flicker. Alternatively, the weighted average determination component provides that the accumulated time value of the previous occasion changes the weight in a period of time comprising approximately two cycles of flicker. Further, the weighted average determination component uses the accumulated time value of the previous occasion to determine the weight using an input calculation formula.

The photometry element of the invention includes divided type photometry elements that are capable of outputting multiple photometry output. The accumulated time establishment component provides that the maximum value of the multiple photometry output of the photometry elements is determinative of the accumulated time value of the subsequent occasion so as to be close to a target value.

The accumulated time establishment component can output the specified accumulated time value in the initial photometry time following the commencement of photometry. Further, the accumulated time establishment component provides that the length of approximately one cycle of the flicker cycle is the accumulated time value in the initial photometry time following the commencement of photometry.

In summary of the invention, the weighted average component obtains the weighted average of the output of the accumulated time establishment component and the accumulated time of the previous occasion on the basis of the output of the weighted average determination component. Since the accumulation operation is accomplished on the basis of this value, there is little likelihood of any influence of flicker allowing good adjustment to changes in the degree of illumination of the object to be photographed.

The weighted average determination component can accurately remove the influence of flicker resulting in a weight corresponding to the accumulated time value. The weighted average determination component is capable of accurately removing the influence of flicker by determining the weight in accordance with the accumulated time of the previous occasion.

The weighted average determination component determines the weight so that when the accumulated time value of the previous occasion is short, then the proportion of the accumulated time value of the previous occasion becomes large; and when the accumulated time value of the previous occasion becomes long, then the proportion of the output of the accumulated time value determination component becomes large, such that the influence of flicker can be removed. This affords accurate monitoring of changes in the degree of illumination of the object to be photographed.

The weighted average determination component adequately mitigates the influence of flicker by changing the weight, based on the accumulated time value of the previous time, in a period of time that includes approximately one cycle of flicker. Such affords good monitoring of changes in the degree of illumination of the object.

The weighted average determination component adequately mitigates the influence of flicker by changing the weight, based on the accumulation value of the previous occasion in a period of time that comprises approximately two cycles of flicker. Such also achieves good monitoring of changes in the degree of illumination of the object to be photographed.

The weighted average determination component allows minute control by determining the weight by use of a calculation formula that inputs the accumulated time value of the previous occasion.

The accumulated time establishment component allows all of the photometry values to fall within the photometry dynamic range by determining the updated accumulated time value such that the maximum value of multiple photometry outputs of photometry elements approach the target value. The accumulated time establishment component overcomes the problem of being unable to obtain an accumulated time value at the time of initial photometry by outputting a specified accumulated time value to the initial photometry time following the commencement of photometry. The accumulated time establishment component makes photometry possible in that there is no influence received from flicker even at the time of initial photometry by making the length of approximately one cycle of the flicker cycle in the initial photometry time following the commencement of photometry to be the accumulated time value.

BRIEF DESCRIPTION OF THE DRAWINGS

These and other aspects and advantages of the invention will become apparent from the following detailed description of preferred embodiments, when taken in conjunction with the accompanying drawings in which.

DETAILED DESCRIPTION OF PREFERRED EMBODIMENTS

While the invention will hereinafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

Figure 1:
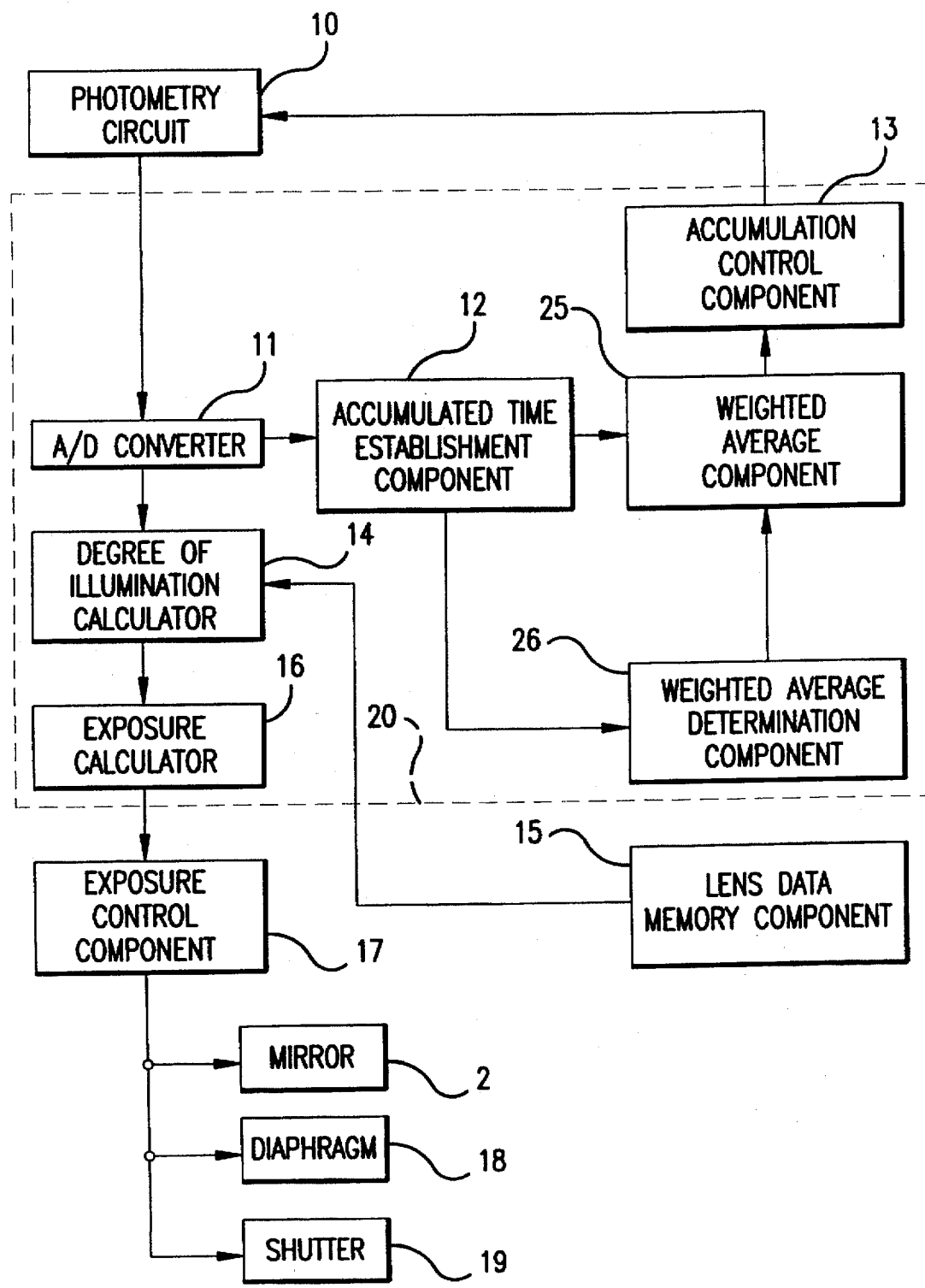
FIG. 1 is a block diagram showing a photometry apparatus of a camera according to a preferred embodiment of the invention.

FIG. 1 is a block diagram showing a photometry apparatus of a camera in accordance with a preferred embodiment of the invention.

The photometry circuit 10 is a circuit that outputs photometry data to accomplish photometry of an object field. The photometry data is put into numerical form by means of an A/D converter 11, after which the data is output to a degree of illumination calculator 14. The degree of illumination calculator 14 calculates the illumination value of the subject to be photographed on the basis of data relating to, e.g., the focal distance of the lens, the open diaphragm value, the exit pupil, and the eclipse. The data is input from the lens data memory component 15. The lens data memory component is stored within the lens. The photometry data from the A/D converter 11, and output from the degree of illumination calculator is input into the exposure calculator 16. The exposure calculator 16 calculates the appropriate exposure value of the object to be photographed on the basis of the degree of illumination value provided by the degree of illumination calculator 14. The exposure control component 17 accomplishes light exposure to the film by controlling a quick return mirror 2, a diaphragm 18, and a shutter 19 on the basis of the appropriate exposure value data obtained from the exposure calculator 16.

The accumulated time establishment component 12 calculates a new accumulated time for a subsequent photometry from the accumulated time of the previous occasion using data that has been put into numerical form by the A/D converter 11. The data is then output to the weighted average component 25 and the weighted average determination component 26.

The weighted average determination component 26 determines the value of the weight to be given data provided from the accumulated time establishment component 12, which is to be weight averaged with previous accumulated time by the weighted average component 25, and outputs the value to the weighted average component 25.

The weighted average component 25 takes the weight of the new accumulated time using the accumulated time establishment component 12 and the data from the weighted average determination component 26, and subsequently outputs value to the accumulation control component 13. The accumulation control component 13 controls the photometry circuit 10, and affects the photometry of the subsequent occasion on the basis of data received from the weighted average component 25.

The A/D converter 11, the accumulated time establishment component 12, the accumulation control component 13, the degree of illumination calculator 14, the exposure calculator 16, the weighted average component 25, and the weighted average determination component 26 are all connected through utilization of a microprocessor (CPU) 20. The CPU includes all of the control circuits. A detailed explanation regarding the programs within the microprocessor 20 will be provided hereafter.

Figure 2:
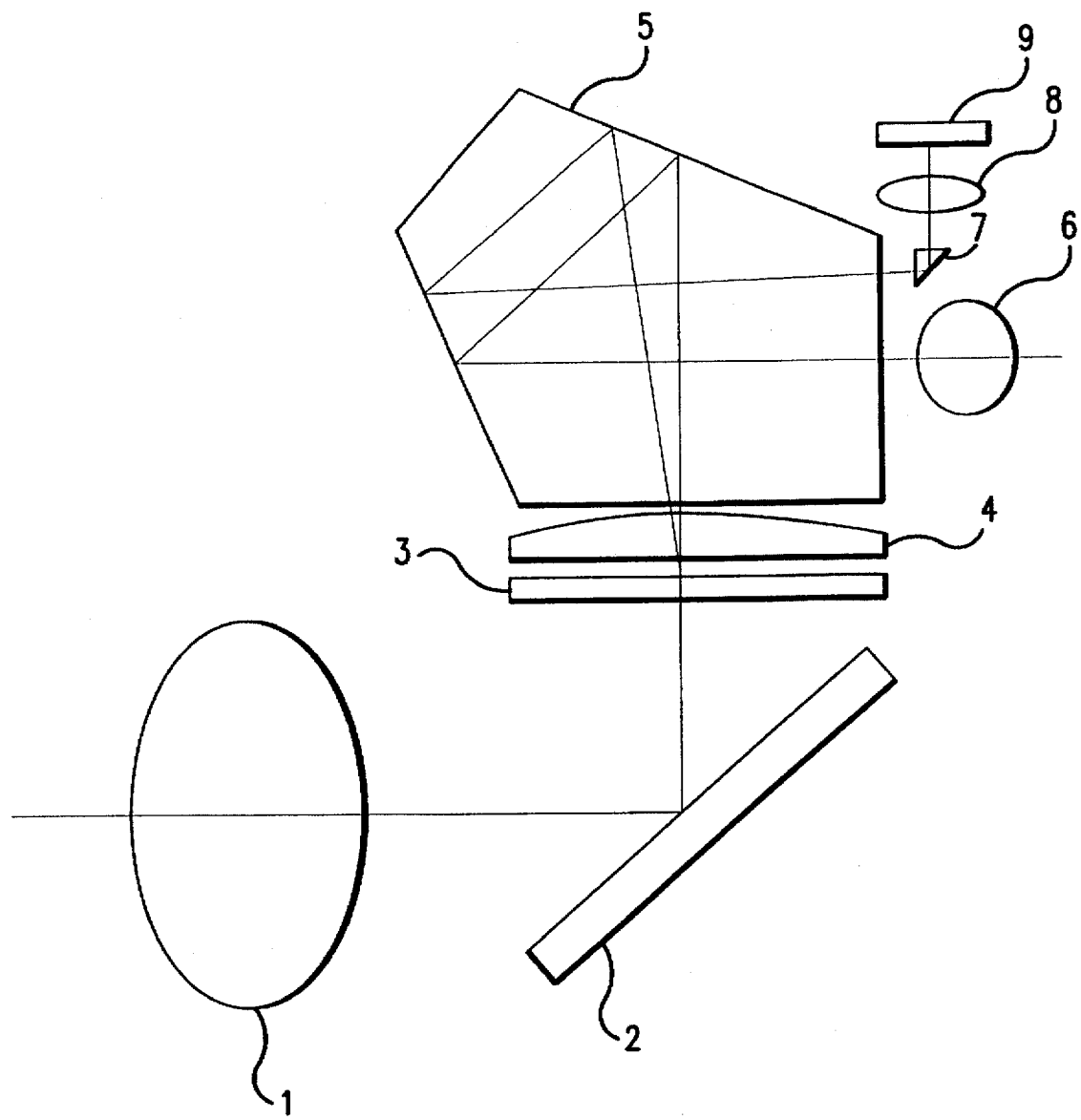
FIG. 2 is a schematic side view of the preferred optical system of the embodiment of FIG. 1.

FIG. 2 is a block diagram showing the preferred optical system of the embodiment of FIG. 1.

Light rays pass through a photographic lens 1, are reflected by a quick return mirror 2, pass through a diffusion screen 3, a condenser lens 4, a pentaprism 5, and an eyepiece lens 6, to reach the eye of the photographer (not shown).

A portion of the light rays, following diffusion by means of the diffusion screen 3, pass through the condenser lens 4, the pentaprism 5, and thereafter a photometry use prism 7 and a photometry use lens 8, to reach the photometry element 9.

Figure 3:
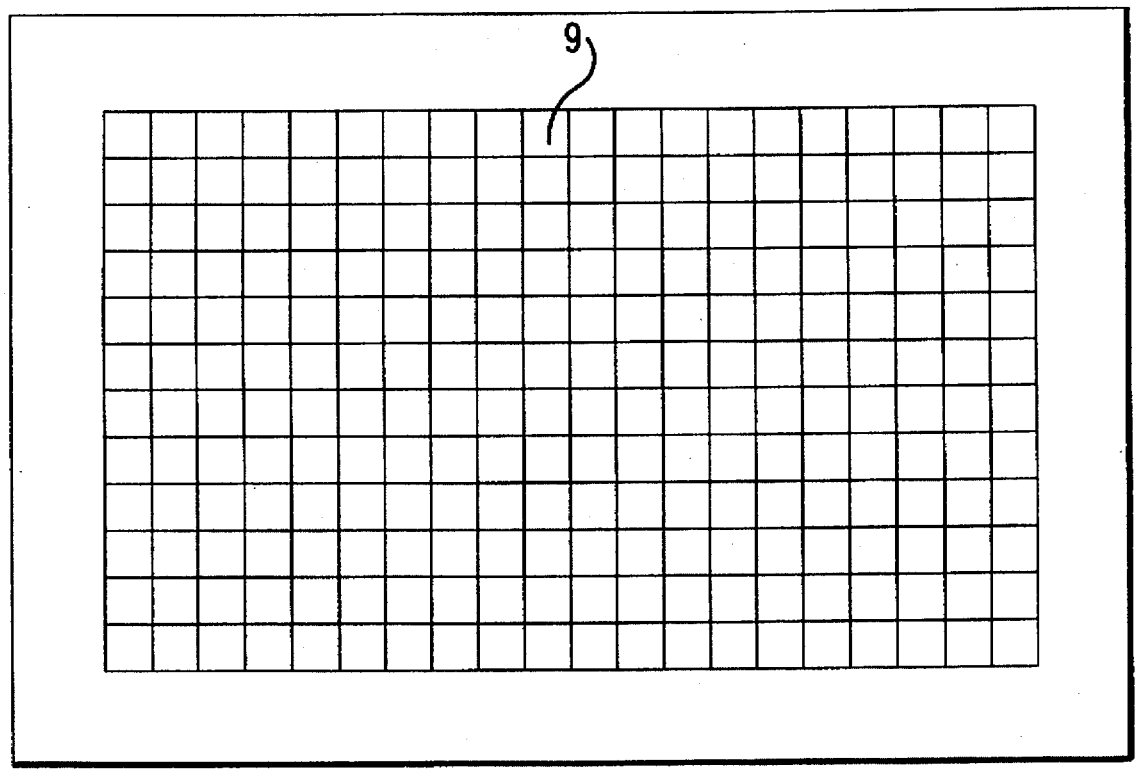
FIG. 3 illustrates the preferred illumination of a divided photographic object field of the photometry element 9 shown in FIG. 2.

FIG. 3 illustrate the preferred illumination of a divided photographic object field of the photometry element 9 shown in FIG. 2. The photometry element 9 is formed of an accumulation type sensor, such as a CCD, and is formed with 12 divisions in the vertical direction, and 20 divisions in the lateral direction, forming a total of 240 areas and dividing almost the entire area of the photographic object field so as to allow photometry of the invention.

Figure 4:
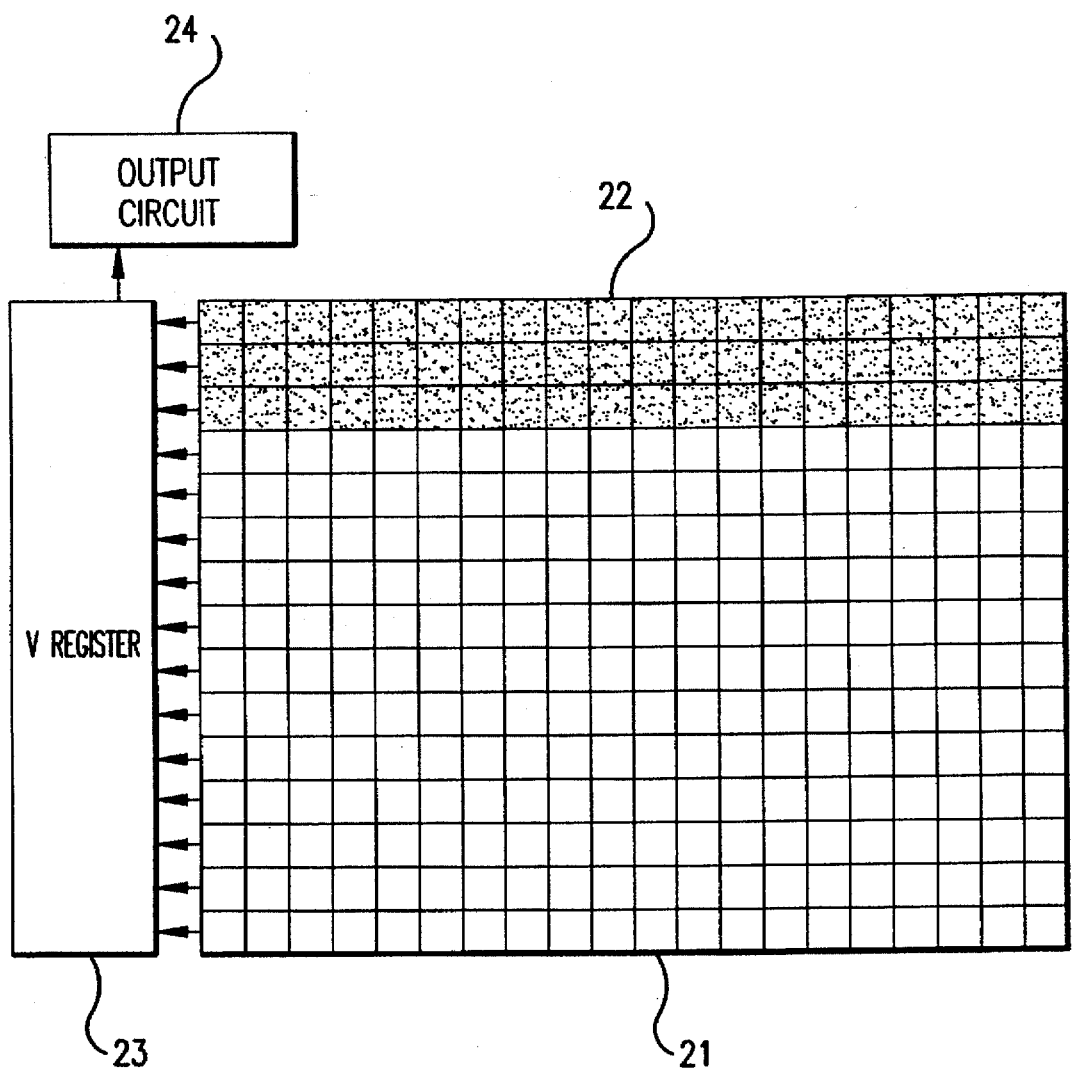
FIG. 4 illustrates the preferred structure of the photometry element 9 shown in FIG. 2.

FIG. 4 illustrates the preferred structure of the photometry element 9 shown in FIG. 2. The photographic image pixels 21 are formed from a photoelectric converter that is divided into 12 pixels vertically, and 20 pixels laterally. Additionally, correction pixels 22, are shown by the painted oblique lines in FIG. 4 and are in the proximity of the photographic image pixels 21. The correction pixels 22 are arranged so as to be divided into 3 pixels in the vertical direction and 20 pixels in the lateral direction. The correction pixels 22 are substantially the same in structure as the photographic image pixels 21. However, the correction pixels comprise a photoelectric converter of a shielded construction. The output of the correction pixels 22 is utilized for dark current correction and amp gain correction. Regarding amp gain correction, such correction is well known in the art and further explanation is omitted. Further explanation with respect to dark current correction is set forth below.

If electric load data of the photographic image pixels 21 and the correction pixels 22 is such that accumulation is completed, then transmission of data is sent to the V register 23 one row at a time by means of an H register (not shown) arranged in the vicinity of each pixel. Thereafter, the data is output to the output circuit 24 one pixel at a time by means of the V register. The output circuit 24 receives the output of the photometry element 9 and converts the electricity load output of each pixel signal into voltage that is amplified one time (gain L), and four times (gain H), by means of the amp.

Figure 5:
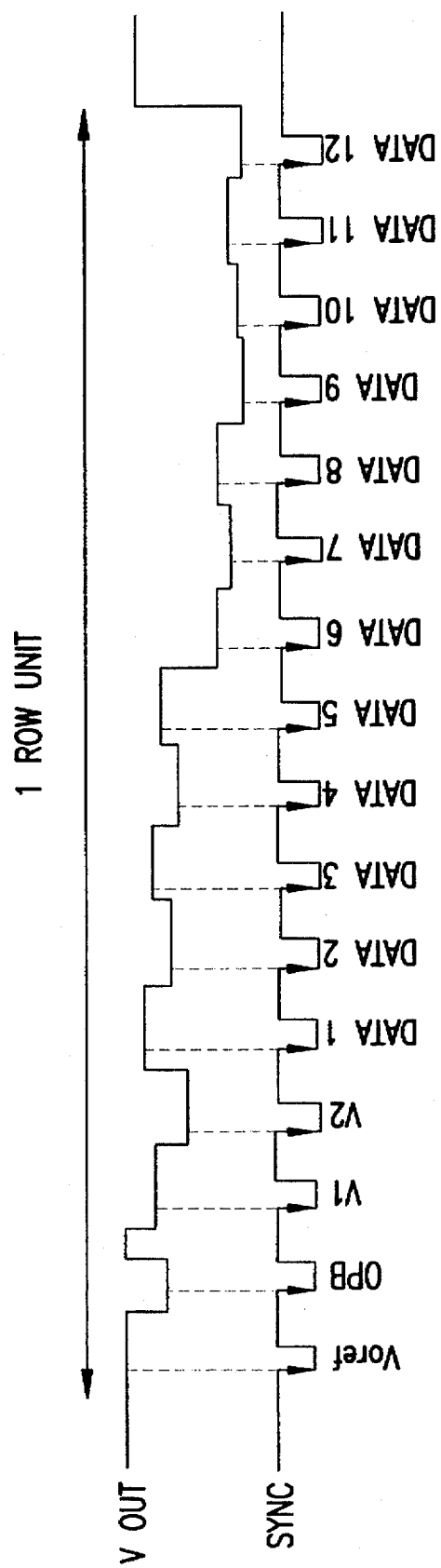
FIG. 5 is a diagram that shows the output chronology of the photometry element 9 shown in FIG. 2.

FIG. 5 is a diagram that shows the signal state of the output signal from the V out terminal of the photometry element 9 shown in FIG. 2.

FIG. 5 shows the signal of the V register of one row. Each output signal is obtained synchronously with the decline of the SYNC of the synchronized clock used for obtaining the signal. Initially, the Voref that is formed from the initial standard voltage is output. Then, the signal components of each pixel realize the Voref as a standard in a direction of low electric potential. Therefrom, each pixel signal is obtained as a difference from the Voref.

Next, the Vopb that comprises the dark current signal is output. Subsequently, the Vopb components are subjected to clamp processing to the Voref level. The resulting output is output resulting from subtraction of all of the Vopb components. Next, the outputs V1 and V2 of the amp gain used for correction are output, following which the photometry data of 12 pixels is output thus completing the outputting of one row of pixels. By repeating this operation 20 times, the readout of one screen is completed.

Figure 6:
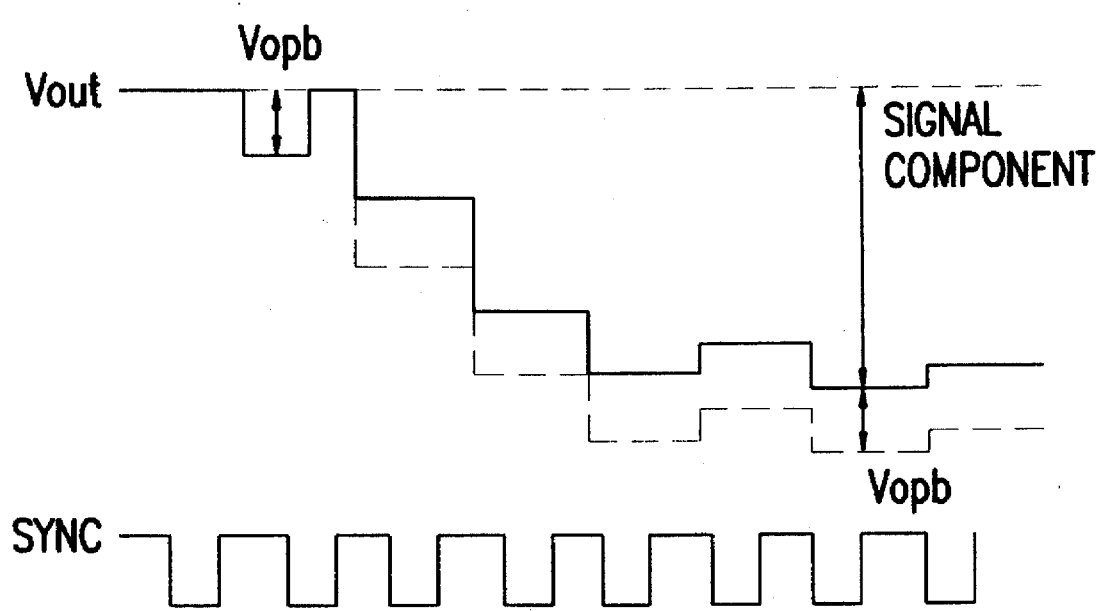
FIG. 6 is a diagram showing the photometry output level of the photometry element according to an embodiment of the invention.

FIG. 6 is a diagram that illustrates the relationship between the Vopb and the output dynamic range of the photometry element 9 shown in FIG. 2.

As discussed above, following the output of the Vopb, through clamp processing to the Voref level; the output following V1, as shown by the solid line is output in a form wherein all of the Vopb components have been removed. If clamping is not accomplished, then the output is shown by the dotted line. Given the structure of the output circuit, the output dynamic range of the photometry element 9 is limited by the sum of each of the signal outputs and by Vopb. In other words, at the point where the output value shown by the dotted line reaches voltage saturation, such becomes the upper limit of the output. Furthermore, to the extent that Vopb is large, the output dynamic range of the photometry components becomes small.

Figure 7A:
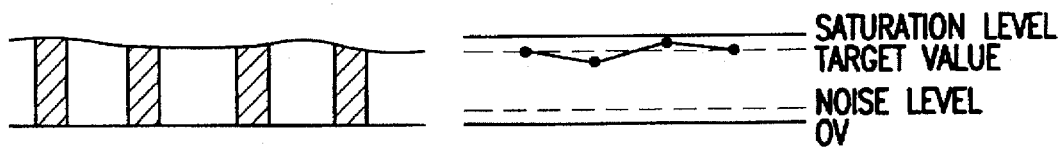
FIGS. 7(A)–7(F) are diagrams that show the light source, the accumulated time, and the photometry output.
Figure 7B:
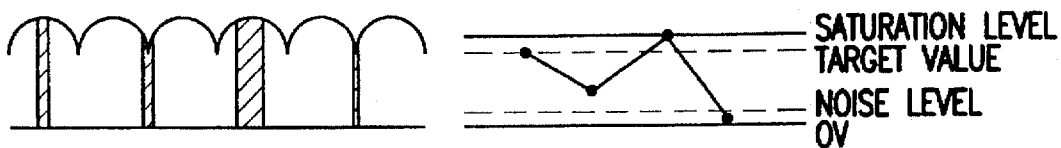

FIGS. 7(A)–7(B) are diagrams that show the control method of the accumulated time of the preferred embodiment of the invention.

The left side of the diagrams show the element of the flicker of the light source and the length of the accumulated time, as well as the timing. The right side of the diagrams shows the photometry output of the corresponding time (the maximized value within the 240 areas). The accumulated time of a subsequent occasion is calculated using the photometry value of the subsequent occasion obtained from the photometry value of the previous occasion and from the accumulated time approaching a target value.

FIG. 7(A) corresponds to the case where there is no flicker in the light source. Since the light source is stable, then the photometry value can also be stable and will be close to the target value.

FIG. 7(B) corresponds to the case where there is flicker in the light source and where the photometry interval is an odd number of approximately two cycles of frequency of flicker. In this case, even if the initial photometry value is the target value, the photometry value of the next occasion will be less than the target value due to the valley of the flicker. Since the accumulated time for increasing the photometry value becomes longer, the subsequent photometry value will become greater than the target value. On the next subsequent occasion, once again the accumulated time will become short, and the resulting photometry value will be under the target value. Thus, if repeated, the operation will result in extreme instability.

Figure 7C:
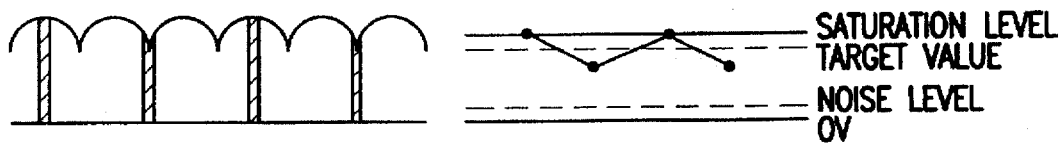

However, as illustrated in FIG. 7(C) the weighted average of the value of the accumulated time of subsequent occasion, as obtained in FIG. 7(B), is weight averaged with the accumulated time value of the previous occasion so as to stabilize the resulting value so that the accumulated time does not suddenly change. Accordingly, the buildup of the weighted average is appropriately adjusted and there is no variance of the accumulated time. However, since there is some residual variance of the photometry value caused by flicker, depending upon circumstances, the photometry value may reach the saturation level.

Figure 7D:
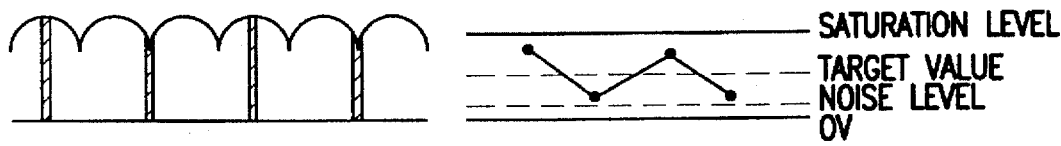

As illustrated in FIG. 7(D), the target value is established to be slightly lower. Thus, even if there is residual variance caused by flicker, since the target value is established to be lower, there is no saturation of the photometry value and accurate photometry data can be obtained.

Figure 7E:
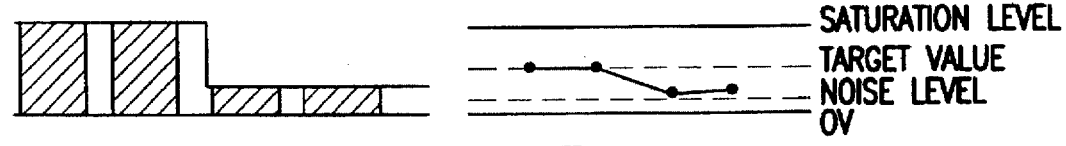

FIG. 7(E) corresponds to the case where the accumulated time is longer than the flicker cycle where the degree of illumination of the object to be photographed has suddenly changed. The method of obtaining the accumulated time and of establishing the target value is the same as with the case shown in FIG. 7(D). Using averaging, even if the illumination value of the object is suddenly changed, the accumulated time will not suddenly change and the program will be able to keep up with the change.

Figure 7F:
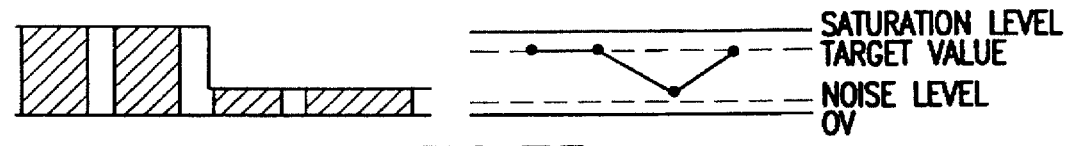

FIG. 7(F) corresponds to the case in which the accumulated time is long, where the buildup of accumulated time of the previous occasion within the weighted averaging is extremely low, and where the buildup is 0. In controlling the newly obtained accumulated time by placing strong weighting thereon, and at the same time assuring a broad photometry dynamic range, the target value is raised. In this case, even if the degree of illumination of the object to be photographed suddenly changes, the accumulated time can be appropriately controlled by means of the second photometry that takes place following the change.

Figure 8:
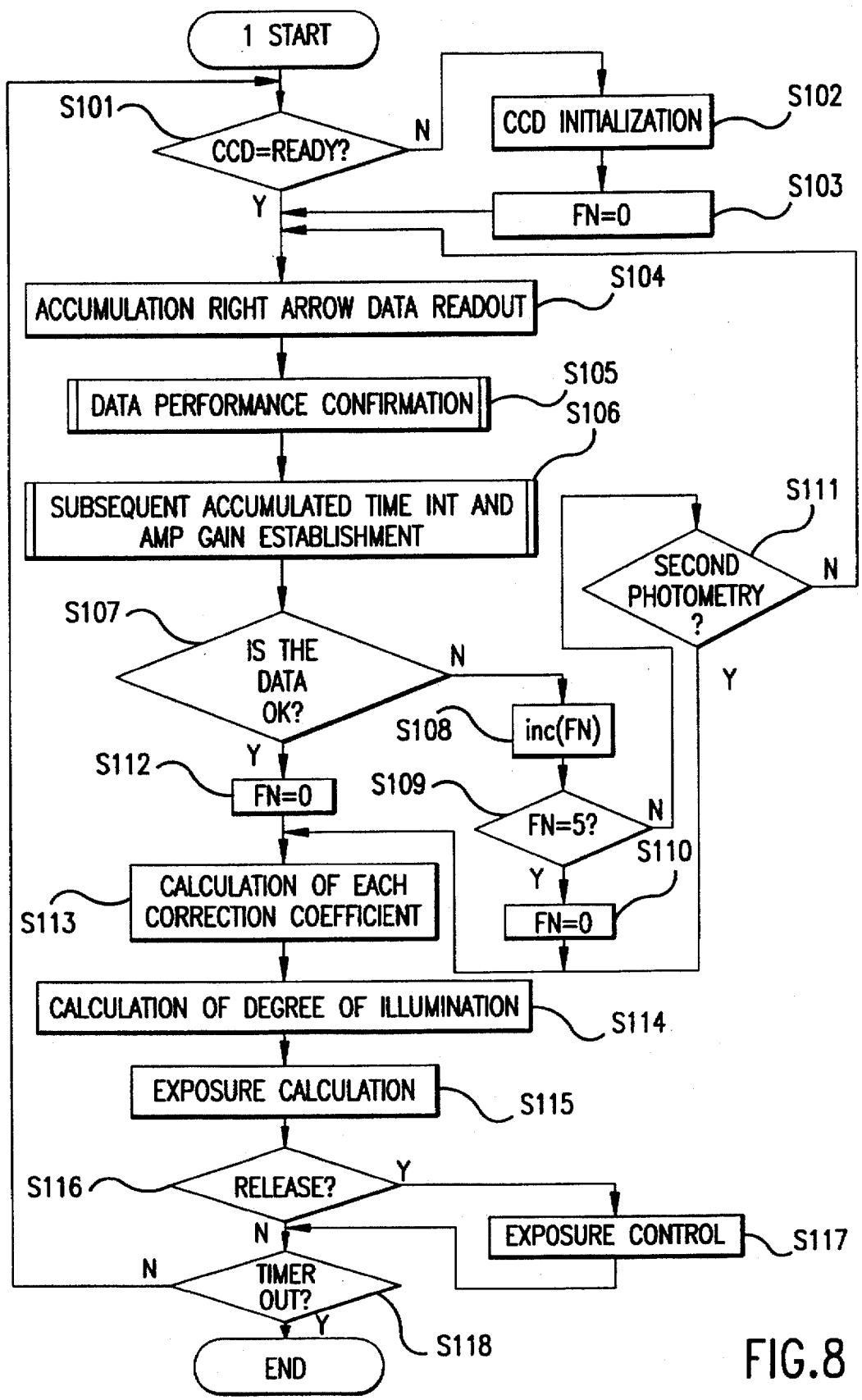
FIG. 8 is a flow chart showing the preferred program of the microprocessor of the embodiment of FIG. 1.

FIG. 8 is a flow chart showing the preferred program of the microprocessor 20 of the embodiment of FIG. 1.

The electric power source of the camera is initiated by half depressing the release button of the camera (not shown), which executes the program.

In Step S101, discrimination is accomplished in order to determine whether it is an initial photometry following an increase in voltage power. If it is an initial photometry, then in Step S102, initialization of the photometry element 9 is accomplished, the gain of the output circuit 24 is established to be L, and the accumulated time t is established to be 10 mS. The accumulated time of 10 mS corresponds to approximately one cycle of a flicker cycle. The reason for this is that if the accumulated time is lengthened until it reaches the extent of the flicker cycle, then the strength or weakness of the flicker within the accumulation is offset, and a photometry value can be obtained in which the influence of the flicker is decreased. With the initial photometry, the conditions under which photometry will be accomplished is not known and thus obtaining a photometry value that is not influenced by the flicker is important in terms of accomplishing subsequent stable photometry. Subsequently, the FN that comprises the photometry loop variable is initialized by means of Step S103.

If it is not the initial photometry, then in Step S104, photometry is accomplished using the set accumulated time, and the photometry data from the respective 240 areas is read out. Next, in Step S105, a determination is made as to whether the obtained photometry data is effective. The means of determination will be explained hereafter with reference FIG. 9.

In Step S106, the combination of the accumulated time of the subsequent photometry time and the amp gain (H/L) of the photometry element 9 is established. The method of obtaining the subsequent accumulated time and the amp gain is explained hereafter with reference FIG. 10.

In Step S107, a determination is made whether the current photometry data is effective, and if it is effective, then in Step S112, FN is cleared to 0, thereafter proceeding to Step S113. In the case in which the data is not effective, 1 is added to FN by means of Step S108.

In Step S109, a determination is made as to whether or not FN=5. In other words, a determination is made whether the photometry error is a five time continuation. In the case where FN=5, the photometry output has not been updated for a long period of time. Owing to this, there is a possibility that the camera will be obstructed to the photographer, which is not desirable in terms of performance. In order for the calculation to be accomplished subsequently, when the data is not effective and in order to renew the exposure control value, the FN is cleared in Step S110, and the program proceeds to the next Step S113.

In the case where FN=5 does not apply, then following the rise in the electric power source by means of Step S111, a determination is made whether it is the second photometry. At the time of the rise in the electric power source, during a period in which the photometry is not yet completed, the exposure value to be controlled is not yet obtained. Furthermore, since exposure control becomes impossible during such a period even if the photographer depresses the release button, exposure must be prevented. If the exposure prevention period is long, then this will affect the ability to take snapshots. Additionally, the photographer may think that the camera is broken, which is also undesirable in terms of performance. Therefore, when there is a second photometry following the rise in the electric power source, in order to minimize exposure prevention time, even if the data effectiveness cannot be assured, the exposure control value is calculated, and the program moves on to Step S113.

The reason for not accomplishing photometry the first time, but rather accomplishing such processing on the second time is as follows. When photometry is accomplished the first time, as explained in Step S102, the accumulated time is fixed at 10 mS and the probability that the data of the photometry of the first time is effective is comparatively small. With photometry of the second time, the accumulated time is adjusted on the basis of the photometry data of the first time, resulting in a high probability that the data is effective. Therefore, when the data of the first time is not effective, the values are immediately corrected. In order to assure the ability to take snapshots with the photometry of the second time, the program is required to proceed to the next step. Further, in the case where the data at the time of the first photometry is effective, but effective data for some reason cannot be obtained with the photometry of the second time, photometry may be accomplished once more since the exposure control value is already calculated using the photometry data of the first time. When making a determination in Step S111, the program may return to Step S104, and the accumulation is corrected.

In Step S113, each corrected data is calculated in order to correct the amp of the photometry data. In Step S114, calculation is accomplished of the absolute illumination value in each photometry region on the basis of the obtained photometry data. In Step S115, the proper exposure value of the object field is calculated on the basis of the obtained absolute illumination value. The method of obtaining proper exposure value is disclosed in detail in Laid-Open Patent Publication No. 6-95200, which was an application of the applicants and is hereby incorporated by reference.

In Step S116, a determination is made whether the release button (not shown) has been depressed. If it has been depressed, then in Step S117, on the basis of the proper exposure value obtained, exposure of the film is accomplished. If the release button is not entirely depressed, then the program immediately proceeds to Step S118. In Step S118, a determination is made by means of a half depression timer whether a specified time has elapsed following the depression and release of the release button. If the button is in the process of a half depression, or if elapsed time is within a specified time, then the program returns to Step S101, and processing is repeated. Additionally, if the timer has cut off, then the program is terminated.

Figure 9:
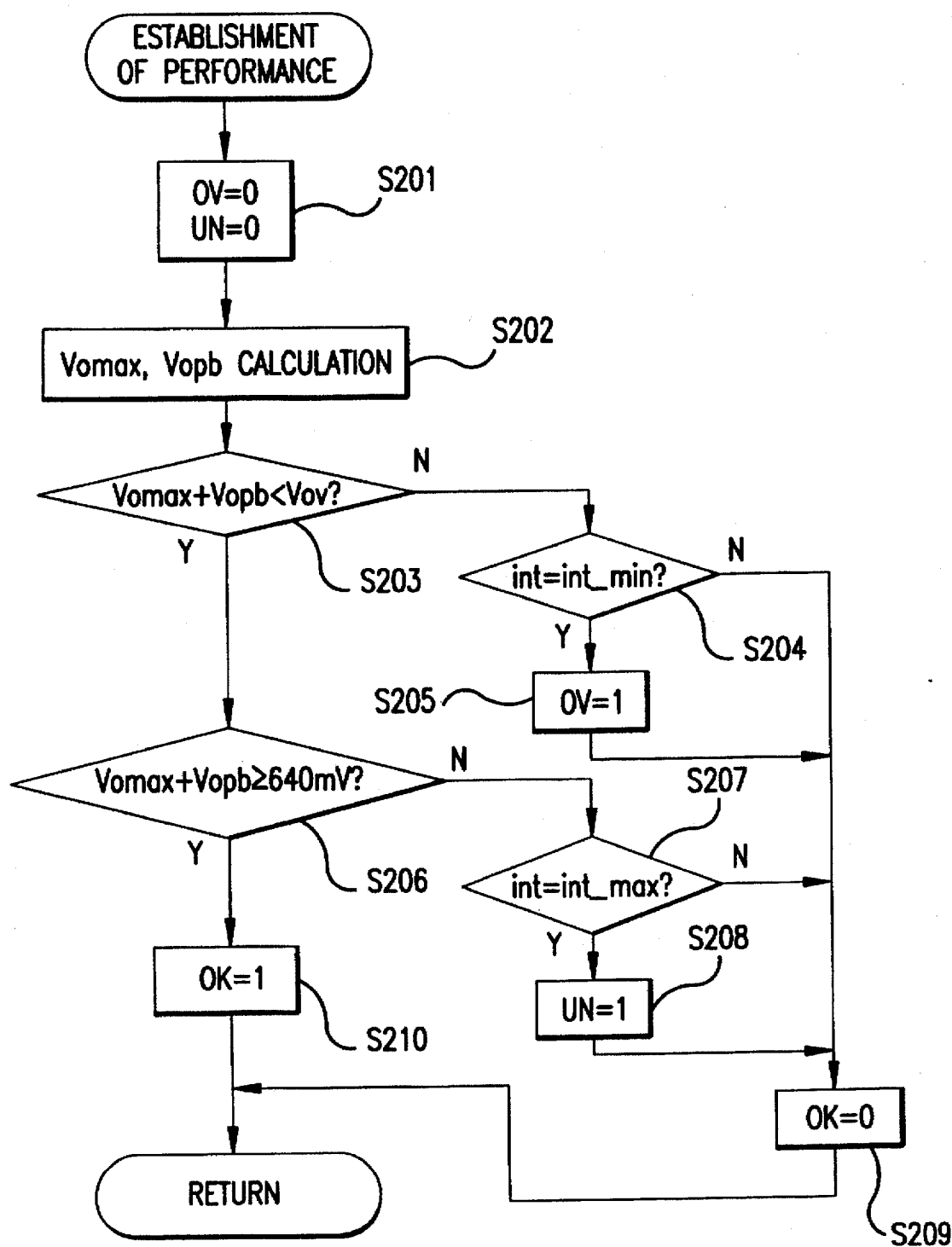
FIG. 9 is a flow chart showing the preferred routine for determining the effectiveness of the photometry data according to the embodiment of FIG. 1.

FIG. 9 is a flow chart showing the preferred subroutine for determining the effectiveness of the photometry data according to the embodiment of FIG. 1. Through the execution of Step S105 shown in FIG. 8, the subroutine can be called and executed.

Initially, in Step S201, the overflow flag OV and the underflow flag UN are cleared to 0. Next, in Step S202, the Vomax and the Vopb are obtained. The Vomax is such that the signal components in photometry data of the 240 areas comprise the photometry data of the maximum area, and the Vopb is the Vopb output in the same row as the photometry area in which the Vomax is present. For example, if the Vomax is present in the data 12 from the data 1 shown in FIG. 5, then the Vopb becomes the OPB shown in the FIGURE.

Next, a determination is made whether the formula (1) below and accomplished in Step S203 is achieved.

$$Vomax + Vopb < Vov \qquad (1)$$

Here, Vov represents the saturated output voltage value of the photometry element 9, which is stored in the non-volatile memory (not shown) within the camera, subsequent to each gain H and gain L. As explained above, the output of the photometry element 9 is output in a form in which the dark current components have already been extracted. The result is that the total of the signal components and the dark electricity components cannot exceed the saturation output voltage value of the photometry element 9. At the time of determining whether the signal is saturated, it is necessary to compare the obtained value of the sum of the signal component and the dark current component. If the numerical formula (1) is achieved, then the program proceeds to Step S206. If the formula has not been achieved, then the program proceeds to Step S204.

In Step S204, a determination is made whether the accumulated time int of the previous occasion is the already predetermined int min, i.e., whether it is equal to the minimum accumulated time. If the accumulated time is the minimum accumulated time, then proceeding to Step S205, the number 1 is substituted in the overflow flag OV and the program proceeds to the next step. The int min, for example, is the numerical value of 10 μS.

In Step S206, a determination is made as to whether the following formula (2) is achieved.

$$Vomax + Vopb \geq 640 \; mV \qquad (2)$$

In this example, the 640 mV of the right side is a value based on an assumption that the saturated output voltage of the photometry element 9 is from 3 V–4 V. For example, when the saturated output voltage of the photometry element 9 is 3.5 V, then looking at the left side of the numerical formula (2), to the extent that the sum Vomax and Vopb is close to this value, the area extending from the brighter components within the field of the photographic object to the dark portion are limited to a photometry dynamic range resulting in obtaining good photometry results of the dynamic range. However, if the value the left side becomes small, then the resulting output of a portion that is darker than this becomes even smaller. This results in the portion being completely buried in noise. It follows that proper photometry results cannot be obtained. Therefore, it is necessary to establish the values on the left side comprising the effective photometry results. In this instance, this value has been established as being 640 mV.

In the case where there is compliance with the numerical formula (2), then proceeding to Step S210, the number 1 is substituted in the flag OK that shows effectiveness, and the processing is completed. When this is not the case, then the program proceeds to Step S207, and a determination is made as to whether the accumulated time int of the previous occasion is the pre-established int max, i.e., whether it is equal to the maximum accumulated time. If the accumulated time is the maximum accumulated time, then proceeding to Step S208, the number 1 is substituted in the underflow flag UN, and the program proceeds to Step S209, where the number 0 is substituted in the performance flag OK, and processing is completed. The int max, for example is a numerical value of about 100 mS.

In the present case, the performance determination accomplished in Step S107 of FIG. 8, through determining whether OK=1, is accomplished such that in the case when OK=0; then when OV=1 and when UN=1, i.e., the photometry upper and lower limits, respectively, are not effective, the photometry boundaries are corrected and the program proceeds to the next step without correcting the photometry itself.

Figure 10:
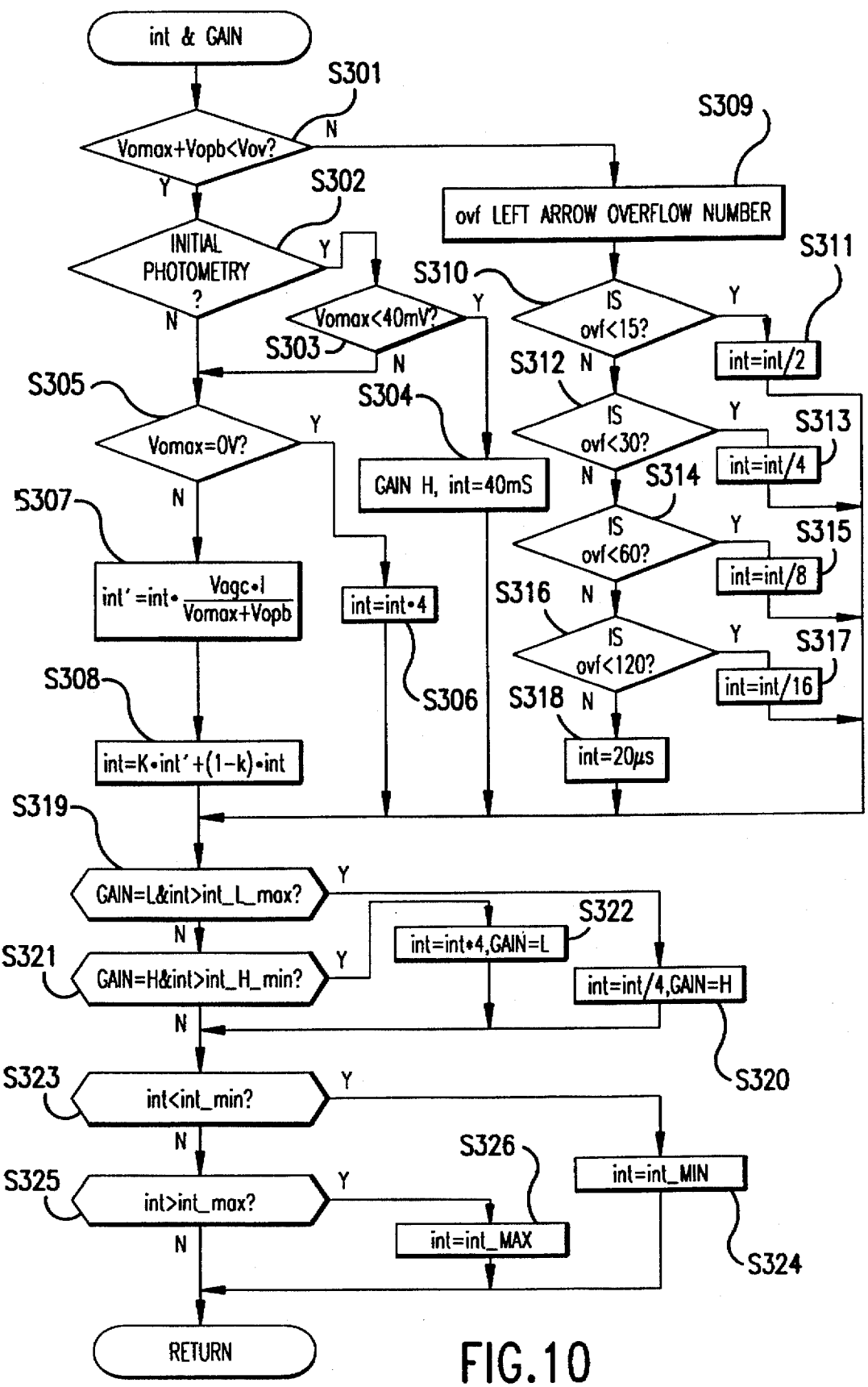
FIG. 10 is a flow chart showing the preferred routine for obtaining the subsequent accumulated time according to the embodiment of FIG. 1.

FIG. 10 is a flow chart showing the preferred subroutine that obtains the subsequent accumulated time int and the amp gain according to the embodiment of FIG. 1.

Through the execution of Step S106 in FIG. 8, the subroutine of FIG. 10 is called and executed. Prior to calling the subroutine of FIG. 10, and after the rise in the electric power source, photometry is accomplished for a minimum of one time, with the immediately previous photometry data remaining in the memory (not shown) within the microprocessor 20.

In Step S301, a determination is made, as in Step S203 of FIG. 9, whether the numerical formula (1) is achieved, i.e., determination is made whether the maximum value of the signal output is saturated. In the case that there is compliance with the numerical formula (1), then the program proceeds to Step S302. In S302, the determination is made whether the photometry data that is stored in memory is the initial photometry following the rise in the electric power source. If it is, then the program proceeds to Step S303, and a determination is made whether Vomax<40 mV. If Vomax is smaller than 40 mV, then it is assumed that the object to be photographed is fairly dark.

In the case in which the release button is immediately and entirely depressed at the time of a rise in the electric power source it is necessary to output the proper exposure value as fast as possible. Thus, in Step S304, the gain of the photometry element 9 is made to be H, and the subsequent accumulated time is unconditionally established to be 40 mS. The numerical value of 40 mS serves as the accumulated time and generally should cover the range extending from the photometry lower limit required by the photometry apparatus of the camera to a brightness where detection is impossible by the photometry of the first occasion. Such is determined collectively with the used optical system. Furthermore, the numerical value should determine the proper value utilizing the ability to take the required snapshots in the camera, the low illumination limits required by the photometry apparatus, and the brightness of the photometry system.

In Step S303, when optimization occurs Vomax>40 mV using the calculation of the subsequent accumulated time. When the relationship is satisfied the program moves on to Step S305. In Step S305, a determination is made whether Vomax=0 V. If positive the subsequent accumulated time in Step S306 becomes four times that of the previous occasion.

When the answer in Step S305 is negative, the program proceeds to Step S307. In S307 a subsequent accumulated time candidate value int' can be obtained using the following numerical formula (2).

$$int'=int\cdot(Vagc\cdot X)/(Vomax+Vopb) \quad (3)$$

If the value of the int' to which the numerical formula (3) has been applied is equal to the temporary brightness of the previous time and to the brightness of the object to be photographed at the time of the subsequent photometry, and if the subsequent photometry is accomplished by means of the accumulated time of int', then the Vomax+Vopb obtained at the time of the subsequent photometry will be equal to Vagc·X.

Figure 11:
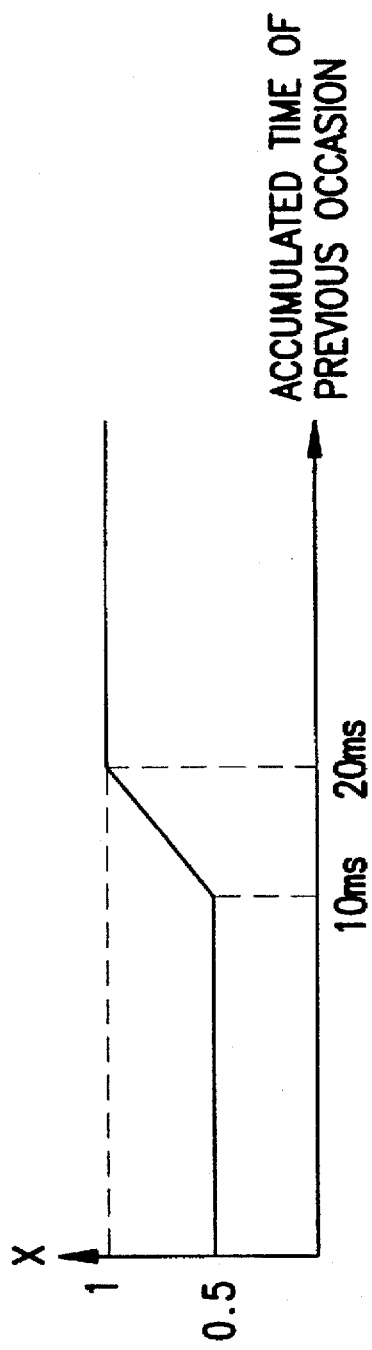
FIG. 11 is a graph that shows the value taken by variable X according to the preferred embodiment of the invention.

Here, int is the accumulated time of the previous occasion, and Vagc is the target value of Vomax+Vopb, which establishes the saturation output voltage value Vov of the photometry element 9 as a base, and stores it in the non-volatile memory (not shown) within the camera. For example, in the case where Vov=3.5 V, the Vagc is established to be about 3 volts, a slightly lower voltage. The factor X is a target value correction coefficient used where aberrations of the photometry data are assumed to be caused by flicker. The value of X may be as shown in FIG. 11 in accordance with the accumulated time int of the previous occasion.

Flicker cycle of an AC electric power source with a frequency of 50 Hz is 10 mS, and with a frequency of 60 Hz is approximately 8.3 mS. Generally speaking, where the flicker time is approximately within the flicker cycle, e.g., approximately 10 mS, the influence of flicker must be considered and X takes a small value of 0.5. Subsequently, since the influence of flicker gradually becomes smaller, the X also gradually becomes bigger, and at 20 mS results in a complete number 1. If applied using the numerical formula (3) then when the accumulated time is less than 10 mS, the photometry target value will be 1.5 V. In the case when the accumulated time is in excess of 20 mS, the photometry value becomes 3 V. In the interim area the target value gradually changes. Change of the photometry target value using the extent of the flicker, is explained with reference to FIG. 7. It is desirable that the X value be optimized using characteristics of the photometry system of the camera and the characteristics of the light source on the object to be photographed. The value X is not limited to the value shown in FIG. 11.

Next, in Step S308, a determination is made of the subsequent accumulation of time by means of the following numerical formula (4).

$$int=K\cdot int'+(1-K)\cdot int \quad (4)$$

Figure 12:
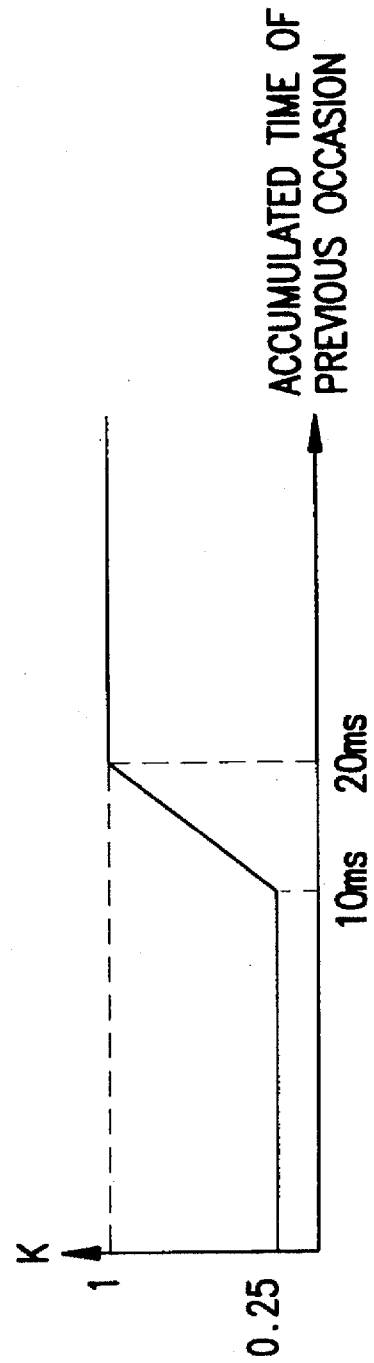
FIG. 12 is a diagram showing the value taken by a variable K according to the preferred embodiment of the invention.
Figure 13A:
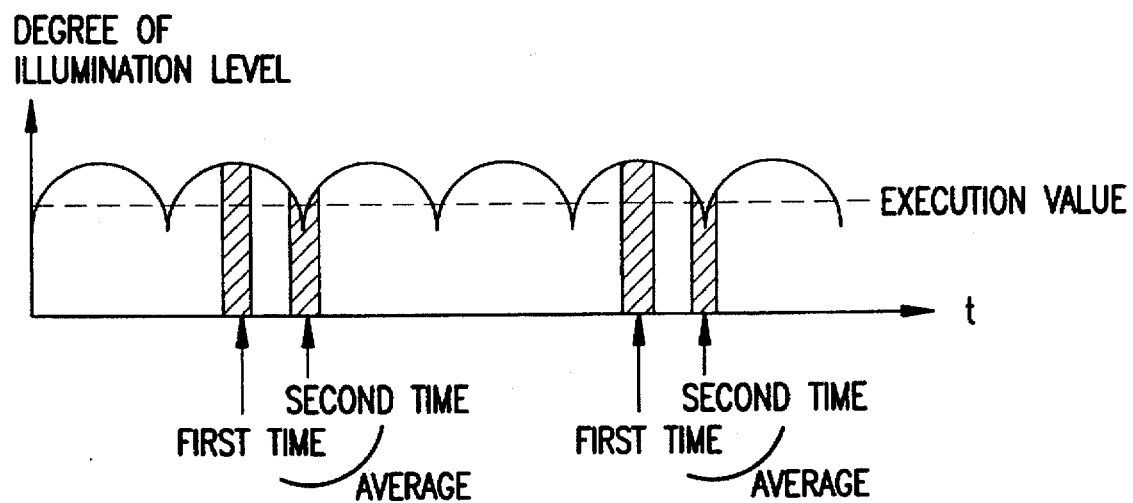
FIGS. 13(A) and 13(B) are explanatory diagrams showing the prior art technology.
Figure 13B:
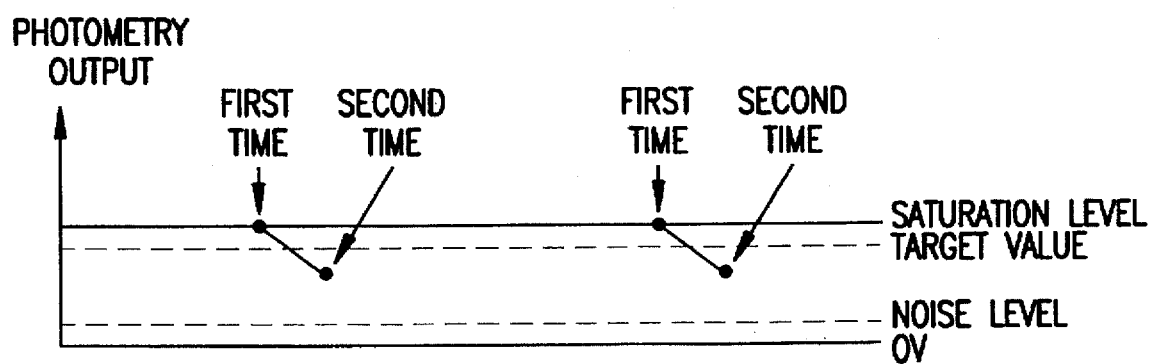

Value int' is the updated accumulated time value obtained in Step S307. Value int is the accumulation value of the previous time. K is a stability coefficient used to ensure that the accumulated time value does not suddenly change and is a variable that takes a value as shown in FIG. 12 that corresponds to the accumulated time value of the previous occasion. In numerical formula (4), when the accumulated time is less than 10 mS, since K=0.25, the subsequent accumulated time becomes weight averaged by the proportion of int' to the number 1 relative to what int is to the number 3.

In addition, in the case that the accumulated time is greater than 20 mS, the influence of flicker is negligible, and K attains the value K=1, attaining the value of 100% int'. The accumulated time between 10 mS and 20 mS, as shown by the numerical formula (5), results in the value of K gradually changing.

$$K=0.075\cdot int-0.5 \quad (5)$$

The value int is the accumulated time value of the previous occasion. The reason that it is preferable that the accumulation value not to be changed very much by means of the extent of flicker is explained with reference to FIG. 7.

Since it is desirable that the value K be optimized using characteristics of the photometry system of the camera, or characteristics of the light source that includes the object, the value K is not limited to the value shown in FIG. 12.

When determination of the numerical formula (1) in Step S301 is negative, then the program proceeds to Step S309, and the number of areas that have overflowed within the 240 areas are counted and substituted in the variable ovf. A determination is then made whether the overflow is such that the signal output of its area plus the dark voltage current output has reached the Vov. The minimum value of ovf is 1 (there is only one saturated area), and the maximum value is 240 (the overflow of all areas).

In Step S310, a determination is made as to whether or not ovf<15. If yes, then in Step S311, the subsequent accumulated time int is established to be one half the accumulated time of the previous occasion. Next, in Step S312, a determination is made as to whether ovf<30. If yes, then in Step S313, the next accumulated time int is established to be one fourth the accumulated time of the previous occasion. Subsequently, in Step S314, a determination is made whether ovf<60, and if yes, then in Step S315, the next accumulated time int is established to be one eighth of the accumulated time of the previous occasion. Next, in Step S316, a determination is made whether ovf>120, and if yes, then in Step S317, the next accumulated time int is established to be one sixteenth of the accumulated time of the previous occasion. In the case where ovf is greater than 121, then int is established to be 20 μS in step S318. Thus, from Step S310 to Step S318, to the extent that the number of the overflowed photometry areas are great, then the brightness of the photographic object field is corrected to be bright, and the subsequent accumulated time is made smaller than that of the previous occasion.

In Step S319, a determination is made whether the relationship between the gain of the accumulated time of the subsequent photometry time is gain L, and int>int L max. The int L max is a threshold value for changing the gain, and the numerical value of the approximate 40 mS may be substituted. In the case where Step S319 is accomplished, then the program proceeds to Step S320, where the gain H is switched in the photometry time of the subsequent occasion, and the accumulated time int becomes ¼ of the value obtained above.

In Step S321, conversely, a determination is made whether the gain is H and int>int H min, and if yes, then the gain of the subsequent photometry time in Step S322 in L, becomes four times the value obtained in the accumulated time above.

In this case, int H min may substitute the numerical value of approximately 5 mS. In addition, as is also understood from the above example, the ratio of the int L max to int H min is desirably a value that is four times more the proportion of the gain H/L. With this approach, even if there is slight variance in the photometry data, in the gain switch, since there are histeresis, the gain switch can be accomplished as needed, and the instability of the photometry value is prevented.

In Step S323, a determination is made whether the subsequent accumulated time falls below the pre-established minimum accumulated time int min, and if it has fallen below, then in Step S324 the accumulated time creeps to int min.

In the same manner, in Step S325, a determination is made whether the subsequent accumulated time is above the pre-established maximum accumulated time int max, and if yes, then in Step S326, the accumulated time creeps to int max. In this example, the int min=10 μS, and int max=100 mS.

Further, in the preferred embodiment, the value of K is changed, as in the numerical formula (4), in accordance with the accumulated time value of the previous occasion. However, the invention is not limited to this, and also may be considered to embody a separate method. For example, a method may be utilized wherein the updated accumulated time value int' obtained in Step S307 of FIG. 10 can be used in lieu of the int of the numerical formula (4). Also, a method may be used taking the average value of int and int'. Also, a method utilizing the average values for the accumulated times of past times that have been stored in memory may be of the same effectiveness.

While the invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A photometry apparatus adapted to perform an accumulation operation of an accumulation type photometry element, said apparatus comprising:

a photometry component that performs photometry of an object field and outputs photometry data;

an accumulated time establishment component that calculates a new accumulated time of the photometry element using the output data of the photometry component and previously accumulated time;

a weighted average determination component that outputs a weight to be given the new accumulated time, which is received from the accumulated time establishment component, to a weighted average component, wherein the weighted average component calculates, using the weight received from the weighted average determination component, a weighted average of the previously accumulated time and the output of the accumulated time establishment component;

and an accumulation control component that controls the accumulation operation of the photometry apparatus on the basis of the output of the weighted average component.

2. The photometry apparatus according to claim 1, wherein the weighted average determination component determines the weight in accordance with the previously accumulated time.

3. The photometry apparatus according to claim 1, wherein the weighted average determination component determines the weight in accordance with previously accumulated time of a previous occasion.

4. The photometry apparatus in accordance with claim 1, wherein the weighted average determination component determines that, when previously accumulated time of a previous occasion is short, then a weight of the previously accumulated time of the previous occasion becomes large, and the weighted average determination component determines that, when previously accumulated time of the previous occasion is long, then the weight of the output of the accumulated time establishment component becomes large.

5. The photometry apparatus according to claim 1, wherein the weighted average determination component uses previously accumulated time of a previous occasion to change the weight in a period of time which comprises a flicker of approximately one cycle unit.

6. The photometry apparatus according to claim 1, wherein the weighted determination component uses previously accumulated time of a previous occasion to change the weight in a period of time which comprises a flicker of approximately two cycle units.

7. The photometry apparatus according to claim 1, wherein the weighted average determination component determines the weight using a calculation formula that inputs previously accumulated time of a previous occasion.

8. The photometry apparatus according to claim 1, wherein the photometry element comprises a division photometry element adapted to output multiple photometry outputs, wherein the accumulated time establishment component determines the next accumulated time so that a maximum value of the multiple photometry outputs of the photometry element is close to a target value.

9. The photometry apparatus according to claim 1, wherein the accumulated time establishment component outputs a specified accumulated time in an initial photometry time following commencement of photometry.

10. The photometry apparatus according to claim 1, wherein the accumulated time establishment component establishes a length of approximately one cycle unit of a flicker cycle to be the previously accumulated time at initial time of photometry following commencement of photometry.

11. A photometry apparatus adapted to perform an accumulation operation of an accumulation type photometry element, said apparatus comprising:

photometry component means for performing photometry of an object field and outputting photometry data;

accumulated time establishment component means for calculating a new accumulated time of the photometry element using the output data of the photometry component means and previously accumulated time;

weighted average determination component means for outputting a weight to be given the new accumulated time, which is received from the accumulated time establishment component, to a weighted average component means for calculating, using the weight received from the weighted average determination component means, a weighted average of the previously accumulated time and the output of the accumulated time establishment component means;

and accumulation control component means for controlling the accumulation operation of the photometry apparatus on the basis of the output of the weighted average component means.

12. The photometry apparatus according to claim 11, wherein the weighted average determination component means determines the weight in accordance with previously accumulated time.

13. The photometry apparatus according to claim 11, wherein the weighted average determination component means determines the weight in accordance with previously accumulated time of a previous occasion.

14. The photometry apparatus according to claim 11, wherein the weighted average determination component means determines that, when previously accumulated time of a previous occasion is short, then a weight of the accumulated time of the previous occasion becomes large, and the weighted average determination component means determines that, when the previously accumulated time of the previous occasion is long, then the weight of the output of the accumulated time establishment component means becomes large.

15. The photometry apparatus according to claim 11, wherein the weighted average determination component means uses previously accumulated time of a previous occasion to change the weight in a period of time which comprises a flicker of approximately one cycle unit.

16. The photometry apparatus according to claim 11, wherein the weighted determination component means uses previously accumulated time of a previous occasion to change the weight in a period of time which comprises a flicker of approximately two cycle units.

17. The photometry apparatus according to claim 11, wherein the weighted average determination component means determines the weight using a calculation formula that inputs previously accumulated time of a previous occasion.

18. The photometry apparatus according to claim 11, wherein the photometry element comprises a division photometry element adapted to output multiple photometry outputs, wherein the accumulated time establishment component means determines the next accumulated time so that a maximum value of the multiple photometry outputs of the photometry element is close to a target value.

19. The photometry apparatus according to claim 11, wherein the accumulated time establishment component means outputs a specified accumulated time in an initial photometry time following commencement of photometry.

20. The photometry apparatus according to claim 11, wherein the accumulated time establishment component means establishes a length of approximately one cycle unit of a flicker cycle to be the previously accumulated time at initial time of photometry following commencement of photometry.

* * * * *